United States Patent
Kurose et al.

(10) Patent No.: US 7,300,715 B2
(45) Date of Patent: *Nov. 27, 2007

(54) MAGNETIC RECORDING MEDIUM

(75) Inventors: Shigeo Kurose, Tokyo (JP); Hiroyuki Tanaka, Tokyo (JP); Kenji Shirasuna, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/874,358

(22) Filed: Jun. 24, 2004

(65) Prior Publication Data

US 2005/0106421 A1 May 19, 2005

(30) Foreign Application Priority Data

Nov. 17, 2003 (JP) ............... 2003-386157
Nov. 17, 2003 (JP) ............... 2003-386158

(51) Int. Cl.
*G11B 5/66* (2006.01)
*G11B 5/70* (2006.01)

(52) U.S. Cl. ................. 428/840.3; 428/848.2

(58) Field of Classification Search ............. 428/141, 428/323, 328, 694 BA, 694 BR, 694 BH, 428/840.2, 840.5, 848.2, 840.3
See application file for complete search history.

(56) References Cited

U.S. PATENT DOCUMENTS 6,579,592 B1 * 6/2003 Matsubaguchi et al. .... 428/141

FOREIGN PATENT DOCUMENTS

| JP | 2001-331924 | 11/2001 |
|----|-------------|---------|
| JP | 2002-312920 | 10/2002 |
| JP | 2002-367140 | 12/2002 |

OTHER PUBLICATIONS

U.S. Appl. No 10/868,914, filed Jun. 17, 2004, Kurose, et al.
U.S. Appl. No. 10/630,849, Jul. 31, 2003, Kurose.

* cited by examiner

*Primary Examiner*—Holly Rickman
(74) *Attorney, Agent, or Firm*—Oblon, Spivak, McClelland, Maier & Neustadt, P.C.

(57) ABSTRACT

A magnetic recording medium is provided, in which a high recording density is realized, and an electromagnetic transducing characteristic and an error rate are improved. The magnetic recording medium includes a non-magnetic layer containing a non-magnetic powder and a binder resin and a magnetic layer containing a ferromagnetic metal powder or hexagonal ferrite magnetic powder and a binder resin on one surface of a non-magnetic support, wherein the ferromagnetic metal powder has an average long axis length of 80 nm or less, or the hexagonal ferrite magnetic powder has an average tabular diameter in the range of from 10 to 40 nm, the three-dimensional center surface average roughness of the magnetic layer surface is 3.0 nm or less in a region of 100 $\mu m^2$ based on a measurement with an atomic force microscope, and the area share held by asperities of at least ±5.0 nm with reference to the surface at an average height is 15 percent or less in a region of 100 $\mu m^2$ on the magnetic layer surface.

17 Claims, No Drawings

MAGNETIC RECORDING MEDIUM

BACKGROUND OF THE INVENTION

1. Field of the Invention

The present invention relates to magnetic recording media, and more particularly, relates to a magnetic recording medium which has improved electromagnetic conversion characteristics and error rates by improvement in surface properties of a magnetic layer.

2. Description of the Related Art

In magnetic recording media used for video recorders, audio apparatuses, computers, and the like, particularly in recent years, there has been an increasing trend toward higher recording density, and in order to meet the trend described above, development of smaller minimum recording unit has been pursued, for example, by shortening recording wavelengths, decreasing recording track widths, and decreasing the thicknesses of recording media. Concomitant with the development described above, movement of making magnetic layers smaller have been in progress, and hence, in recent years, ferromagnetic metal powders or hexagonal ferrite magnetic powders, having fine particle sizes and large magnetic energy, have begun to be used.

However, when magnetic powders are formed into finer particles, and higher magnetic energy is imparted to the powders, individual particles thereof become very liable to increase their cohesive force, and as a result, there has been a problem in that sufficient dispersibility of a magnetic powder in a magnetic paint is difficult to realize. The dispersibility of the magnetic powder in the magnetic paint is significantly important in order to obtain higher reproduction output of shortwave information and superior S/N ratio (SNR). Since the dispersibility of the magnetic powder has direct relationship with surface properties of the magnetic layer, in order to solve the problem described above, it has been required that the dispersibility is improved so as to realize superior surface properties.

As techniques relating to improvement in surface properties of magnetic layers, for example, a magnetic recording medium has been disclosed in Japanese Unexamined Patent Application Publication No. 2002-312920 in which the ratio of protrusions of an abrasive having a height of 15 nm or more, which is measured by a atomic force microscope (hereinafter referred to as an "AFM"), with respect to a predetermined area of a magnetic layer surface is controlled in a predetermined range so that a magnetic recording medium having high output, high recording density, and superior running durability can be realized. In addition, in Japanese Unexamined Patent Application Publication No. 2001-331924, a magnetic recording medium has been disclosed which has high density recording properties, superior electromagnetic conversion characteristics having durability, and superior handling properties in a manufacturing process. In the magnetic recording medium described above, the ratio of the total area of protrusions on the magnetic layer having a height of 10 nm or more, measured by an AFM, from a reference surface is controlled in a predetermined range, and at least one of a fatty acid and a fatty acid ester is contained in at least one of the magnetic layer and the non-magnetic layer provided thereunder so that the surface lubricant index is controlled in a predetermined range.

Furthermore, a magnetic recording medium has been disclosed in Japanese Unexamined Patent Application Publication No. 2002-367140, in which the ratio of protrusions on a surface of a magnetic layer containing a hexagonal ferrite magnetic powder, the protrusions having predetermined diameter and height, is controlled in a predetermined range so as to suppress the generation of thermal asperity (TA) and realize superior high density properties at the same time.

As described above, in response to recent requirements of higher recording density of magnetic recording media, it has been desired that even when magnetic powders are formed into fine particles, superior dispersibility thereof, that is, superior surface properties of magnetic layers, can be obtained, and that magnetic recording media are realized which simultaneously have a higher recording density, and superior medium characteristics such as electromagnetic transducing characteristics, eg., an S/N ratio, an error rate and the like.

SUMMARY OF THE INVENTION

Accordingly, in the case in which a ferromagnetic metal powder or a hexagonal ferrite magnetic powder is used as a magnetic powder, an object of the present invention is to provide a magnetic recording medium which can realize a higher recording density and which can simultaneously improve an electromagnetic transducing characteristic and an error rate, by improving the dispersibility of the powder so as to realize superior surface properties.

In order to overcome the above-described problems, a magnetic recording medium of the present invention comprises: a non-magnetic substrate; a non-magnetic layer containing a non-magnetic powder and a binder resin; and a magnetic layer containing a ferromagnetic metal powder and a binder resin, in which the non-magnetic layer and the magnetic layer are provided on one side surface of the non-magnetic substrate. In the magnetic recording medium described above, the ferromagnetic metal powder has an average long axis length of 80 nm or less, a three-dimensional center surface average roughness of the magnetic layer surface in a region of 100 $\mu m^2$ based on a measurement with an atomic force microscope is 3.0 nm or less, and the area share held by asperities of at least ±5.0 nm with reference to the surface at an average height is 15 percent or less in a region of 100 $\mu m^2$ on the above-described magnetic layer surface based on a measurement with an atomic force microscope.

In addition, another magnetic recording medium according to the present invention comprises: a non-magnetic substrate; a non-magnetic layer containing a non-magnetic powder and a binder resin; and a magnetic layer containing a hexagonal ferrite magnetic powder and a binder resin, in which the non-magnetic layer and the magnetic layer are provided on one side surface of the non-magnetic substrate. In said another magnetic recording medium described above, the hexagonal ferrite magnetic powder has an average tabular diameter in the range of from 10 to 40 nm, a three dimensional central-plane average roughness of a surface of the magnetic layer in a region of 100 $\mu m^2$ based on a measurement with an atomic force microscope is 3.0 nm or less, and the area share held by asperities of at least ±5.0 nm with reference to the surface at an average height is 15 percent or less in a region of 100 $\mu m^2$ on the above-described magnetic layer surface based on a measurement with an atomic force microscope.

In particular, the magnetic recording medium of the present invention is preferably applied to a magnetic recording and reproducing system in which reproduction is performed using a magnetoresistance (MR) head. In addition, as the binder resin contained in the non-magnetic layer described above, a resin having an electron-beam functional group is preferably used. Furthermore, the thickness of the magnetic layer described above is preferably 300 nm or less.

As described above, techniques in which the surface properties of a magnetic layer, that is, the asperities of the surface, are defined using an AFM have been known; however, since the object of the technique disclosed in Japanese Unexamined Patent Application Publication No. 2002-312920 is to improve running durability such as head abrasion properties and head contamination, it is apparently different from the object of the present invention which relates to the improvement in electromagnetic transducing characteristics. In addition, in the case in which the technique described above is applied to a magnetic recording and reproducing system using an MR head, protrusions having a height of 15 nm or more are too large and are not satisfactory as the surface properties of a magnetic recording medium used for the MR head. In addition, as for the surface properties of the magnetic layer, the technique disclosed in Japanese Unexamined Patent Application Publication No. 2001-331924 only defines the total area of the protrusions having a predetermined height or more from the reference surface and does not describe concave portions at all, and hence it is different from the present invention.

Furthermore, the technique disclosed in Japanese Unexamined Patent Application Publication No. 2002-367140 relates to the surface protrusions having a height of 100 nm or more, which is greatly different from the range of the surface roughness of the present invention, and as is the technique disclosed in Japanese Unexamined Patent Application Publication No. 2002-312920, the surface properties of the magnetic layer of the technique described above is not good enough to satisfy the requirement of a magnetic recording and reproducing system using an MR head.

In the magnetic recording medium of the present invention, with respect to the magnetic layer surface, the three-dimensional center surface average roughness is 3.0 nm or less and the area share held by asperities of at least ±5.0 nm with reference to the surface at an average height is 15 percent or less in a region of 100 µm$^2$ based on a measurement with an AFM, as described above. When this is measured by a method described in, for example, Japanese Unexamined Patent Application Publication No. 2001-331924, the area of magnetic layer surface protrusions having heights of at least 10 nm from the reference surface based on a measurement with an AFM becomes about an order of magnitude smaller than 33 µm$^2$ which is shown in Comparative example 3 and is the minimum value in Japanese Unexamined Patent Application Publication No. 2001-331924.

According to the present invention, since even when a magnetic powder having a very fine particle diameter is used, the dispersibility thereof in a magnetic layer can be improved, and hence superior surface properties thereof can be realized. As a result, a magnetic recording medium can be realized which has improved electromagnetic conversion characteristics and error rates in addition to higher recording density.

DESCRIPTION OF THE PREFERRED EMBODIMENTS

Hereinafter, the embodiments of the present invention will be described in detail.

A magnetic recording medium of the present invention comprises: a non-magnetic substrate; a non-magnetic layer containing a non-magnetic powder and a binder resin; and a magnetic layer containing a ferromagnetic metal powder or a hexagonal ferrite magnetic powder and a binder resin, in which the non-magnetic layer and the magnetic layer are provided on one side surface of the non-magnetic substrate. In the magnetic recording medium described above, the ferromagnetic metal powder or the hexagonal ferrite magnetic powder is allowed to become finer, and the surface properties of the magnetic layer are controlled within predetermined ranges using two types of parameters which are measured by an atomic force microscope (AFM).

In particular, the ferromagnetic metal powder used in the present invention is a fine ferromagnetic metal powder which has an average long axis length of 80 nm or less, preferably 20 to 80 nm, and more preferably 20 to 75 nm. When the ferromagnetic metal powder has an average long axis length of more than 80 nm, the electromagnetic conversion characteristics are adversely influenced. In addition, as the ferromagnetic metal powder described above, for example, a ferromagnetic metal powder is preferably used having a coercive force Hc of 119.4 to 238.7 kA/m (1,500 to 3,000 Oe), a saturation magnetization σs of 100 to 160 A·m$^2$/kg (100 to 160 emu/g), an average short axis length of 10 to 20 nm, and an aspect ratio of approximately 1.2 to 8.0. In addition, elements such as Co, Ni, Al, Si, Y, or a rare earth metal may be added to the powder described above in accordance with application.

In addition, the hexagonal ferrite magnetic powder used in the present invention is a fine hexagonal ferrite magnetic powder having, in particular, an average tabular diameter of 10 to 40 nm and preferably 10 to 35 nm. When the average tabular diameter of the hexagonal ferrite magnetic powder is more than 40 nm, the electromagnetic conversion characteristics are adversely influenced, and in contrast, when the average tabular diameter is less than 10 nm, it is difficult to obtain stable magnetization due to thermal fluctuation. As the hexagonal ferrite magnetic powder described above, for example, a hexagonal ferrite magnetic powder is preferably used having a coercive force Hc of 79.6 to 318.3 kA/m (1,000 to 4,000 Oe), a saturation magnetization σs of 40 to 80 A·m$^2$/kg (40 to 80 emu/g), and a tabular ratio of approximately 1.5 to 7.0. In addition, elements such as Co, Ni, Cu, Ti, Zn, Sn, Mg, Mn, or a rare earth metal may be added to the powder described above in accordance with application.

The ferromagnetic metal powder or the hexagonal ferrite magnetic powder described above may be contained in a magnetic layer composition at a content of approximately 70 to 90 percent by weight. When the content of the ferromagnetic metal powder or the hexagonal ferrite magnetic powder is too high, the content of the binder resin is decreased, and hence surface smoothness obtained by calendaring is liable to decrease. In contrast, when the content is too low, high reproduction output becomes difficult to realize.

In addition, in the present invention, the three-dimensional center surface average roughness of the magnetic layer surface is 3.0 nm or less, preferably 2.5 nm or less, in a region of 100 µm$^2$ based on a measurement with an AFM. If this three-dimensional center surface average roughness exceeds 3.0 nm, the electromagnetic transducing characteristic is adversely affected. Furthermore, the area share held by asperities of at least ±5.0 nm with reference to the surface at an average height is 15 percent or less, preferably is 10 percent or less, in a region of 100 µm$^2$ on the above-described magnetic layer surface based on a measurement with an AFM. If this area share exceeds 15 percent, the electromagnetic transducing characteristic is adversely affected as well.

In the present invention, in order to obtain superior surface properties of the magnetic layer, as described above, the ferromagnetic metal powder or the hexagonal ferrite magnetic powder, which is allowed to become finer, is used for the magnetic layer, and in addition, the state of asperities on the surface are defined by parameters determined by AFM measurement. Hence, when the conditions described above can be fulfilled, constituent materials for the magnetic layer other than the ferromagnetic metal powder or the hexagonal ferrite magnetic powder and constituent materials for the non-magnetic layer are not particularly limited; however, it is preferable that the other constituent materials mentioned above be appropriately selected so as to improve the dispersibility in both the magnetic layer and the non-magnetic layer. That is, in the present invention, individual constituent materials, such as the ferromagnetic metal powder or the hexagonal ferrite magnetic powder, an abrasive, carbon black, and the like to be contained in the magnetic layer, and the non-magnetic powder, an abrasive, carbon black, and the like to be contained in the non-magnetic layer, are preferably prepared so as to have a fine particle diameter. In addition, since the powders having a fine particle diameter thus formed tend to show inferior dispersibility in a magnetic paint and/or a non-magnetic paint, it is preferable that appropriate binder resins and/or dispersing agents be selected for the magnetic layer and the non-magnetic layer.

As the binder resin for the magnetic layer, conventionally known thermoplastic resins, thermosetting resins, various radiation curable resins, and mixtures thereof may be preferably used and are not particularly limited.

As the thermoplastic resins, resins having a softening temperature of 150° C. or less, a number average molecular weight of 500 to 200,000, and a polymerization degree of approximately 50 to 2,000 may be used, and as for the thermosetting resins and the radiation curable resins, resins may be used which have the number average molecular weight and the polymerization degree equivalent to that of the thermoplastic resins described above and which will have a very high molecular weight by a cross-linking reaction performed by heating and/or electron-beam radiation, following coating, drying, and calendaring.

Among those mentioned above, combinations of vinyl chloride-based copolymers and polyurethane resins as shown below are preferably used.

In vinyl chloride-based copolymers, the content of vinyl chloride is 60 to 95 percent by weight or preferably 60 to 90 percent by weight, and the average polymerization degree is preferably approximately 100 to 500.

As the vinyl chloride-based copolymers described above, for example, there may be mentioned vinyl chloride-vinyl acetate-vinyl alcohol copolymers, vinyl chloride-hydroxyalkyl(meth)acrylate copolymers, vinyl chloride-vinyl acetate-maleic acid copolymers, vinyl chloride-vinyl acetate-vinyl alcohol-maleic acid copolymers, vinyl chloride-vinyl acetate-hydroxyalkyl (meth)acrylate copolymers, vinyl chloride-vinyl acetate-hydroxyalkyl (meth)acrylate-maleic acid copolymers, vinyl chloride-vinyl acetate-vinyl alcohol-glycidyl (meth)acrylate copolymers, vinyl chloride-hydroxyalkyl (meth)acrylate-glycidyl (meth)acrylate copolymers, and vinyl chloride-vinyl acetate-vinyl alcohol-glycidyl (meth)acrylate copolymers. Among those mentioned above, copolymers formed of vinyl chloride and monomers having an epoxy (glycidyl) group are preferable. In the vinyl chloride-based copolymers mentioned above, copolymers having a polar group such as a sulfate group and/or a sulfonic acid group (hereinafter simply referred to as an "S-containing group") are preferable. In the S-containing group ($-SO_4Y$ or $-SO_3Y$), Y may be either hydrogen (H) or an alkali metal; however, when Y is potassium (K), that is, $-SO_4K$ or $-SO_3K$, it is particularly preferable.

The S-containing groups described above may be used alone or in combination for the copolymer, and when both of them are used in combination, the ratio therebetween may be optionally selected. In addition, the S-containing groups are preferably contained in a molecule at a content of 0.01 to 10 percent by weight and particularly preferably 0.1 to 5 percent by weight in the form of an S atom.

In addition, as the polar groups, besides the S-containing groups, $-OPO_2Y$ groups, $-PO_3Y$ groups, $-COOY$ groups (Y is H or an alkaline metal), $-N^+R_3$ groups, $-NR_2$ groups (R is H, an alkyl, or a hydroxyalkyl group), and the like may also be used.

The polyurethane resins used together with the vinyl chloride-based resins described above are useful particularly in superior abrasion resistance and adhesion to the substrate and may have polar groups, hydroxyl groups, and the like as side chains, and in particular, polar groups containing sulfur (S), phosphorous (P), and/or nitrogen (N) are preferable.

The polyurethane resin is a generic name of a resin obtained by reaction between a compound containing polyisocyanates and a resin containing hydroxyl groups, such as polyester polyol and/or polyether polyol, and is formed by polymerization using starting materials described below in detail so as to have a number average molecular weight of approximately 500 to 100,000. The Q value (weight average molecular weight/number average molecular weight) of the resin thus formed is approximately 1.5 to 4.

In addition, among the polyurethane resins used for forming the binder resins, when at least two types of resins having different glass transition temperatures Tg in the range of from −20 to 100° C. are used, and the total amount thereof is from 10 to 90 percent by weight of the total binder resin, it is preferable since running stability under high temperature environment, calendar workability, and electromagnetic conversion characteristics are well balanced.

In addition, the vinyl chloride-based copolymer and the polyurethane resin provided with S, P, and/or N-containing polar groups are preferably mixed together in the ratio of 10:90 to 90:10. Besides those resins described above, various known resins may also be used at a content of 20 percent by weight or less of the total.

Among starting materials for the polyurethane resins, as resins containing hydroxyl groups, for example, there may be mentioned polyalkylene glycol, such as polyethylene glycol, polypropylene glycol, and polybutylene glycol; alkylene oxide adducts of bisphenol A and the like; and polyester polyols having various glycols and hydroxyl groups at terminal ends of molecules.

As carboxylic acid components of polyester polyols, for example, there may be mentioned aromatic dicarboxylic acids, such as terephthalic acid, orthophthalic acid, isophthalic acid, and 1,5-naphthalene dicarboxylic acid; aromatic oxycarboxylic acids such as p-oxybenzoic acid and p-(hydroxy-ethoxy)-benzoic acid; aliphatic dicarboxylic acid such as succinic acid, adipic acid, azelaic acid, sebacic acid, and dodecanedicarboxylic acid; unsaturated aliphatic acids and alicyclic dicarboxylic acids such as fumaric acid, maleic acid, itaconic acid, and tetrahydroxyphthalic acid, and hexahydroxyphthalic acid; and tri- and tetra-carboxylic acids such as trimellitic acid, trimesic acid, and pyromellitic acid.

In addition, as glycol components of the polyester polyols, for example, there may be mentioned ethylene glycol, propylene glycol, 1,3-propane diol, 1,4-butane diol, 1,5-pentane diol, 1,6-hexane diol, neopentyl glycol, diethylene glycol, dipropylene glycol, 2,2,4-trimethyl-1,3-pentane diol, 1,4-cyclohexane dimethanol, ethylene oxide adducts and propylene oxide adducts of bisphenol-A or the like, ethylene oxide adducts and propylene oxide adducts of hydrogenated bisphenol-A, polyethylene glycol, polypropylene glycol, and polytetramethylene glycol. In addition, tri- and tetra-ols such as trimethylol ethane, trimethylol propane, glycerin, and pentaerythritol may be additionally used.

As other polyester polyols, for example, there may be mentioned lactone-based polyester diols obtained by ring-opening polymerization of lactones such as caprolactone.

As the polyisocyanates used in the present invention, for example, there may be mentioned diisocyanate compounds such as tolylene diisocyanate, phenylene diisocyanate, diphenylmethane diisocyanate, hexamethylene diisocyanate, tetramethylene diisocyanate, naphthalene diisocyanate, isophorone diisocyanate, xylylene diisocyanate, diisocyanatomethylcyclohexane, diisocyanatocyclohexylmethane, dimethoxybiphenylene diisocyanate, and diisocyanate diphenyl ether; and triisocyanate compounds such as tolylene diisocyanate trimers and hexamethylene diisocyanate trimers, the content of which is 7 mole percent or less with respect to the total isocyanate group.

As thermoplastic resins other than those mentioned above, for example, (meth)acrylic resins, polyester resins, acrylonitrile-butadiene copolymers, polyamide resins, poly (vinyl butyral) resins, nitrocelluloses, styrene-butadiene copolymers, poly(vinyl alcohol) resins, acetal resins, epoxy resins, phenoxy resins, polyether resins, polyfunctional polyethers such as polycaprolactone, polyimide resins, and phenol resins may be mentioned.

In addition, as the thermosetting resins, for example, phenol resins formed by condensation polymerization, epoxy resins, curable polyurethane resins, urea resins, butyral resins, formal resins, melamine resins, alkyd resins, silicone resins, curable acrylic resins, polyamide resins, epoxy-polyamide resins, unsaturated polyester resins, and urea-formaldehyde resins may be mentioned.

Of the copolymers described above, copolymers having hydroxyl groups at terminal ends and/or side chains are preferably used as a reactive resin since crosslinking using isocyanates or modification by electron-beam crosslinking can be easily employed, and in addition, copolymers having polar groups containing sulfur (S), phosphorous (P), and/or nitrogen (N) at terminal ends and/or side chains may also be used since the dispersibility is preferably improved by the presence thereof. Those described above may be used alone or in combination.

The content of the binder resin used for the magnetic layer is preferably 5 to 40 parts by weight and particularly preferably 10 to 30 parts by weight with respect to 100 parts by weight of the ferromagnetic metal powder or the hexagonal ferrite magnetic powder. When the content of the binder resin is too small, the strength of the magnetic layer is decreased, and as a result, the running durability is liable to be degraded. In contrast, when the content is too large, the content of the ferromagnetic metal powder or the hexagonal ferrite magnetic powder is decreased, and as a result, the electromagnetic conversion characteristics are degraded.

As crosslinking agents for curing the binder resins described above, for example, known various polyisocyanates may be mentioned for the thermosetting resins, and the content of the crosslinking agent mentioned above is preferably set to 10 to 30 parts by weight with respect to 100 parts by weight of the binder resin. In addition, to the magnetic layer, whenever necessary, abrasives, dispersing agents such as a surfactant, higher fatty acids, and other various additives may also be added.

As the abrasives mentioned above, various powdered inorganic materials having a Mohs' hardness of 9 or more are preferably used, and for example, in particular, there may be mentioned α-alumina (α-$Al_2O_3$), silicon carbide (SiC), and chromium oxide ($Cr_2O_3$). Of those mentioned above, α-alumina (α-$Al_2O_3$) is preferable. The average particle diameter of the abrasive is preferably from 0.01 to 0.5 μm and more preferably from 0.02 to 0.4 μm. When the average particle diameter is more than 0.5 μm, the height of protrusions from the surface of the magnetic layer is increased, and the surface properties of the present invention cannot be obtained. On the other hand, when the average particle diameter is less than 0.01 μm, abrasion capability required as the magnetic recording medium cannot be obtained, thereby causing head clogging and the like while reproduction is performed. The content of the abrasive is 3 to 25 parts by weight with respect to 100 parts by weight of the ferromagnetic metal powder or the hexagonal ferrite magnetic powder and preferably 5 to 20 parts by weight. When the content is more than 25 parts by weight, since the content of the ferromagnetic metal powder in the magnetic layer is decreased, the magnetic characteristics are degraded, and hence the electromagnetic conversion characteristics are degraded. In contrast, when the content is less than 3 parts by weight, the abrasion capability required as the magnetic recording medium cannot be obtained, thereby causing head clogging and the like while reproduction is performed.

Paints for the magnetic layer are prepared by adding organic solvents to the components described above. The solvents used for this purpose are not specifically limited. For example, various solvents including ketone-based solvents, such as methyl ethyl ketone (MEK), methyl isobutyl ketone, and cyclohexanone, and aromatic solvents such as toluene may be mentioned, and those solvents may be used alone or in combination. The content of the organic solvent may be set to approximately 100 to 900 parts by weight with respect to 100 parts by weight of the total of a solid component (the ferromagnetic metal powder or the hexagonal ferrite magnetic powder, the abrasive, and the like) and the binder resin.

The thickness of the magnetic layer is preferably 300 nm or less in order to achieve higher recording density, more preferably 10 to 300 nm, and even more preferably 10 to 250 nm. When the magnetic layer has a thickness of more than 300 nm, self-demagnetization loss and thickness loss are increased, and as a result, the electromagnetic conversion characteristics and the error rate are degraded.

In addition, the non-magnetic layer of the present invention contains at least the non-magnetic powder and the binder resin. As the non-magnetic powders, various inorganic powders and carbon black may be used. As the inorganic powders, for example, needle-like non-magnetic iron oxide (α-$Fe_2O_3$) may be used. In addition, calcium carbonate ($CaCO_3$), titanium oxide ($TiO_2$), barium sulfate ($BaSO_4$), α-alumina (α-$Al_2O_3$), and the like may also be used.

In addition, as the carbon black, for example, furnace black for rubber, thermal black for rubber, black for coloring, and acetylene black may be used. Carbon black having a BET specific surface of 5 to 600 $m^2$/g, a DBP oil absorption of 30 to 400 ml/100 g, and an average particle diameter of 10 to 100 nm may be preferably used. Usable carbon black may be optionally selected with reference to, for example, "The Carbon Black Handbook" (compiled by the Carbon Black Association).

The ratio of the inorganic powder to the carbon black is preferably set to 90/10 to 10/90 on a weight basis. When the ratio of the inorganic powder is more than 90, a problem of the surface electrical resistance may arise. On the other hand, when the ratio thereof is less than 10, the coating film strength is decreased.

As the binder resin for the non-magnetic layer, as is the case of the magnetic layer, conventionally known thermoplastic resins, thermosetting resins, radiation curable resins, and the mixture thereof may be used. However, among those mentioned above, the radiation curable resins are most preferable. Hereinafter, the reasons thereof will be described.

A multilayer coating film composed of a magnetic layer and a non-magnetic layer may be formed by a method (1) comprising the steps of applying a non-magnetic paint to a non-magnetic substrate, and applying a magnetic paint on the paint thus applied while it is still in a wet state, or a method (2) comprising the steps of applying a non-magnetic paint, followed by drying, calendaring, and curing, and then applying a magnetic paint. When the methods described above are compared to each other, in view of the flatness and the uniformity of the interface between the magnetic layer and the non-magnetic layer, the method (2) is superior. In the method (1), the interface between the magnetic layer and the non-magnetic layer becomes uneven, and as a result, output fluctuation may occur in some cases.

Accordingly, when the multilayer coating film is formed by the above method (2), in order to prevent the non-magnetic layer from swelling, crosslinking reaction of the binder resin contained in the non-magnetic layer must be completed when the magnetic layer is applied thereto. Hence, binder resins to be used for this purpose are limited to the radiation curable binder resins. That is, in order to obtain sufficient coating film properties of conventionally used thermoplastic resins and thermosetting resins, a roll provided with the non-magnetic layer by coating must be placed in an oven for a long period of time (for example, at 70° C. for 2 to 48 hours) for curing. This process not only increases the number of manufacturing steps but also further tightly fastens the roll described above, thereby causing problems of deformation of the non-magnetic coating film and degradation in smoothness of the surface thereof.

In order to avoid the disadvantages described above, when the non-magnetic layer is provided, a film of the non-magnetic layer is formed by coating using a radiation curable resin as the binder resin, followed by drying, calendaring, and radiation exposure, so as to form a three-dimensional network by crosslinking, and subsequently, the magnetic layer is formed thereon by coating; hence, a preferable result can be obtained. According to the method described above, since the non-magnetic layer is already three-dimensionally cross-linked when the magnetic layer is provided thereon, it will not swell with an organic solvent at all, and hence application of the magnetic paint can be directly and immediately performed thereon, thereby achieving a continuous and simpler process.

The radiation curable binder resins preferably used in the present invention are resins having an electron-beam functional group which contains at least one unsaturated double bond in a molecular chain, in which radicals are generated by radiation, and curing occurs by crosslinking or polymerization. As the resins having an electron-beam functional group, for example, there may be mentioned resins which are formed so as to have electron-beam sensitivity by providing a (meth)acrylic double bond using known methods to thermoplastic resins such as vinyl chloride-based copolymers, polyurethane resins, (meth)acrylic resins, polyester resins, acrylonitrile-butadiene copolymers, polyamide resins, poly(vinyl butyral), nitrocelluloses, styrene-butadiene copolymers, poly(vinyl alcohol) resins, acetal resins, epoxy resins, phenoxy resins, polyether resins, polyfunctional polyether compounds such as polycaprolactone, polyamide resins, polyimide resins, phenol resins, polybutadiene elastomers, chlorinated rubbers, acrylic rubbers, isoprene rubbers, and epoxy modified rubbers.

In addition, in consideration of the stability at a production stage and electron-beam cure properties, the content of the electron-beam function group is 1 to 40 mole percent and preferably 10 to 30 mole percent with respect to a hydroxyl group component, and in the case of vinyl chloride-based copolymers, when monomers are allowed to react to form 1 to 20 functional groups per one molecule and preferably 2 to 10 functional groups per one molecule, electron-beam curable resins having both superior dispersibility and cure properties can be obtained. Furthermore, at the terminal ends and/or side chains, as polar groups, acidic polar groups, basic polar groups, and the like, such as —COOH, —SO$_3$M, —OSO$_3$M, —OPO$_3$M, —PO$_3$M, —PO$_2$M, —N$^+$R$_3$Cl$^-$, and —NR$_2$ (where M indicates hydrogen or an alkaline metal, and R indicates hydrogen, methyl, or ethyl) are preferably provided, and the presence of those groups is useful to improve the dispersibility.

The radiation amount of electron beams is shown by the absorption dosage of the non-magnetic layer, and when the absorption dosage is increased, the curing reaction further proceeds. The radiation amount is preferably from 2.5 to 15 Mrad, more preferably 3.5 to 10 Mrad, and even more preferably 4 to 10 Mrad. When the radiation amount is too small, the curing is not sufficient, and as a result, the non-magnetic layer may be damaged by a solvent contained in the magnetic paint in some cases. In contrast, when the radiation amount is too large, the structure of the resin and the non-magnetic substrate may be destroyed in some cases, and as a result, the reliability is liable to be degraded.

The non-magnetic paint may be formed by using an organic solvent equivalent to that for the magnetic layer, and the content of the solvent may also be approximately equivalent to that for the magnetic layer. The amount of the organic solvent may be set to approximately 100 to 900 parts by weight with respect to 100 parts by weight of the total of a solid component (carbon black, powdered inorganic material, and the like) and the binder resin.

To the non-magnetic layer of the present invention, whenever desired, lubricants, dispersing agents such as surfactants, and other various additives may also be added.

The thickness of the non-magnetic layer is preferably 2.5 µm or less, more preferably 0.1 to 2.3 µm, and even more preferably 0.2 to 2.1 µm. Even when the thickness is increased to more than 2.5 µm, improvement in properties cannot be further expected. On the other hand, since the thickness is liable to become uneven when the coating film is formed, the coating conditions become limited, and as a result, the surface smoothness is also likely to be deteriorated.

The non-magnetic substrate may be formed, for example, from various flexible materials, that is, known resin films made of polyester resins, such as poly(ethylene terephthalate) (PET) and poly(ethylene naphthalate) (PEN), polyamide resins, and aromatic polyamide resins, and laminates made of those resins mentioned above. In addition, the thickness of the non-magnetic substrate may be in the range similar to that known in the past and should not be particularly limited.

In addition, in the present invention, a back coat layer may be provided on a surface of the non-magnetic substrate, the surface being opposite to that on which the non-magnetic layer and the magnetic layer are formed. Binder resins used for the back coat layer may be the same as those for the magnetic layer and the non-magnetic layer, and various thermoplastic resins, thermosetting resins, reactive type resins, radiation sensitive modified resins, and the like may be used. The combination of the resins mentioned above may be optionally determined in consideration of properties of magnetic recording media, process conditions, and the like.

Whenever necessary, powdered non-magnetic inorganic materials such as various abrasives used for the magnetic layer; carbon black; dispersing agents such as surfactants; lubricants such as higher fatty acids, fatty acid esters, silicone oils, and the like; and other various additives may also be added to the back coat layer.

The thickness of the back coat layer (after calendaring) is set to 0.1 to 1.0 μm and preferably 0.2 to 0.8 μm. When the thickness is more than 1.0 μm, the friction generated at a path along which a medium runs is too much increased, and as a result, the running stability tends to be degraded. In contrast, when the thickness is less than 0.1 μm, peeling of the back coat layer is likely to occur while the medium runs.

In addition, in order to realize the surface asperities according to the present invention, in addition to the selection of the individual constituent materials described above, in particular, it is preferable that selection of kneading conditions in a paint manufacturing process, dispersing conditions and filtration conditions, coating and drying conditions in a coating process, and calendaring conditions be appropriately performed. Above all, it has been believed that paint dispersing conditions in the paint manufacturing process have significant influence on the asperities of the surface.

As dispersing media used for a dispersing step of the paint manufacturing process, conventionally used glass beads, metal beads, alumina beads, titania beads, zirconia beads, and the like may be used, and among those mentioned above, ceramic-based beads, such as zirconia beads and titania beads, are preferable. Since the surface asperities can be decreased when the diameter of the dispersing media is decreased, the diameter thereof is preferably 2.0 mm or less, more preferably 1.5 mm or less, and, in particular, most preferably from 0.05 to 1.25 mm. When the diameter of the dispersing media is more than 2.0 mm, it becomes difficult to obtain the desired surface properties according to the present invention.

In addition, as dispersing machines used in the dispersing step, for example, an Agitator Mill LMJ or LMZ, and a Ultra Fine Pulverizer AMC manufactured by Ashizawa Finetech Ltd.; a Pure Grain Mill, a Nano Grain Mill, and a Pico Grain Mill manufactured by Asada Iron Works Co., Ltd.; a Super Apex Mill manufactured by Kotobuki Engineering & Manufacturing Co., Ltd.; an SC Mill manufactured by Mitsui Mining Co. Ltd. may be used.

In particular, since having surface properties suitable for an MR head, the magnetic recording medium of the present invention is preferably applied to a magnetic recording and reproducing system in which reproduction is performed using an MR head.

EXAMPLES

Hereinafter, the present invention will be described in detail with reference to examples.

Examples 1 to 7 and Comparative Examples 1 to 4

[Magnetic Paint 1-A]

Preparation of Binder Solution
The following composition was charged in a hyper mixer and was mixed by agitation, thereby forming a binder solution.

| | |
|---|---|
| Vinyl chloride-based resin (MR-110 made by Zeon Corporation) | 10 parts by weight |
| Polyester polyurethane resin (UR-8300 made by TOYOBO CO., Ltd.) | 7 parts by weight |
| Methyl ethyl ketone | 21 parts by weight |
| Toluene | 21 parts by weight |
| Cyclohexanone | 21 parts by weight |

Kneading
The following composition was charged in a pressure kneader and was then kneaded for two hours.

| | |
|---|---|
| α-iron (Fe) magnetic powder (a) (Hc of 167 kA/m (2,100 Oe), σs of 130 $Am^2/kg$ (130 emu/g), BET specific surface area of 58 $m^2/g$, and average long axis length of 75 nm) | 100 parts by weight |
| α-$Al_2O_3$ (HIT-60A made by Sumitomo Chemical Co., Ltd.; average particle diameter of 0.20 μm) | 10 parts by weight |
| The above binder solution | 40 parts by weight |

The following composition was added to a slurry obtained from the above composition through kneading, thereby obtaining an optimum viscosity for dispersing treatment.

| | |
|---|---|
| The above binder solution | 40 parts by weight |
| Methyl ethyl ketone | 15 parts by weight |
| Toluene | 15 parts by weight |
| Cyclohexanone | 15 parts by weight |

Dispersing Treatment
Agitator Mill LMJ manufactured by Ashizawa Finetech K.K. was filled with zirconia beads of 0.8 mm in diameter at a filling rate of 85%, the slurry thus obtained was processed by dispersing treatment. In this step, the residence time for the dispersing treatment (hereinafter simply referred to as "residence time" in some cases) was set to 60 minutes.

Viscosity Controlling Solution
The following composition was charged in a hyper mixer, and mixed by agitation for one hour, thereby forming a viscosity controlling solution.

| | |
|---|---|
| Stearic acid | 0.5 parts by weight |
| Myristic acid | 0.5 parts by weight |
| Butyl Stearate | 0.5 parts by weight |

-continued

| | |
|---|---|
| Methyl ethyl ketone | 210 parts by weight |
| Toluene | 210 parts by weight |
| Cyclohexanone | 210 parts by weight |

Finish Dispersing Treatment

The above viscosity controlling solution was added to a slurry obtained by the above dispersing treatment, mixed together by agitation, and then charged in an Agitator Mill LMZ manufactured by Ashizawa Finetech Ltd. provided with zirconia beads at a filling rate of 85%, the beads having bead diameters (medium diameter) shown in Tables 1 and 2 below, and subsequently, finish dispersing treatment was performed in this mill, thereby forming a paint. The residence times for the dispersing treatment are also shown in Table 1 and 2 below. For the paint thus obtained, circulation filtration was performed using a depth filter with a 95% cut filtration accuracy of 1.2 μm.

Final Paint

To 100 parts by weight of the paint obtained by the filtration described above, 0.8 parts by weight of an isocyanate compound (Colonate L made by Nippon Polyurethane Industry Co., Ltd.) was added and mixed by agitation, followed by circulation filtration using a depth filter with a 95% cut filtration accuracy of 1.2 μm, thereby obtaining a final paint 1-A for the magnetic layer.

[Magnetic Paint 1-B]

Except that an α-Fe magnetic powder (b) (Hc of 179 kA/m (2,250 Oe), σs of 138 $Am^2$/kg (138 emu/g), BET specific surface area of 59 $m^2$/g, and average long axis length of 60 nm) was used instead of the α-Fe magnetic powder (a), a magnetic paint 1-B was prepared in the same manner as that described above.

[Magnetic Paint 1-C]

Except that an α-Fe magnetic powder (c) (Hc of 167 kA/m (2,100 Oe), σs of 110 $Am^2$/kg (110 emu/g), BET specific surface area of 70 $m^2$/g, and average long axis length of 40 nm) was used instead of the α-iron magnetic powder (a), a magnetic paint 1-C was prepared in the same manner as that described above.

[Magnetic Paint 1-D]

Except that an α-Fe magnetic powder (d) (Hc of 161 kA/m (2,025 Oe), σs of 127 $Am^2$/kg (127 emu/g), BET specific surface area of 59 $m^2$/g, and average long axis length of 95 nm) was used instead of the α-Fe magnetic powder (a), a magnetic paint 1-D (comparative sample) was prepared in the same manner as that described above.

[Non-magnetic Paint 1]

Preparation of Binder Solution

The following composition was charged in a hyper mixer and was then agitated, thereby forming a binder solution.

Electron-beam curable vinyl chloride-based resin
10 parts by weight
(TB-4246 made by TOYOBO CO., Ltd., formed by acrylic modification of MR-110 made by Zeon Corporation using 2-isocyanatoethyl methacrylate; polymerization degree of 300, the number of —$SO_3K$, polar groups, being 1.5 per one molecule, and the number of acrylic groups being 6 per one molecule)

Electron-beam curable polyester polyurethane resin
7 parts by weight
(TB-1216 made by TOYOBO CO., Ltd., number average molecular weight of 20,000, Tg of 10° C., and the number of acrylic groups being 6 per one molecule)

| | |
|---|---|
| Methyl ethyl ketone | 21 parts by weight |
| Toluene | 21 parts by weight |
| Cyclohexanone | 21 parts by weight |

Kneading

The following composition was charged in a pressure kneader and was then kneaded for two hours.

| | |
|---|---|
| Needle-like α-$Fe_2O_3$ (DAN-855BX made by Toda Kogyo Corp., average long axis length of 70 nm, and BET specific surface area of 58 $m^2$/g) | 85 parts by weight |
| Carbon black (#950B made by Mitsubishi Chemical Corporation; average particle diameter of 16 nm, BET specific surface area of 260 $m^2$/g, and DPB oil absorption of 74 ml/100 g) | 15 parts by weight |
| The above binder solution | 40 parts by weight |

The following composition was added to a slurry obtained from the above composition through kneading, thereby obtaining an optimum viscosity for dispersing treatment.

| | |
|---|---|
| The above binder solution | 40 parts by weight |
| Methyl ethyl ketone | 15 parts by weight |
| Toluene | 15 parts by weight |
| Cyclohexanone | 15 parts by weight |

Dispersing Treatment

By an Agitator Mill LMJ manufactured by Ashizawa Finetech Ltd. provided with zirconia beads 0.8 mm in diameter therein at a filling rate of 85%, the slurry thus obtained was processed by dispersing treatment. In this step, the residence time for the dispersing treatment was set to 60 minutes.

Viscosity Controlling Solution

The following composition was charged in a hyper mixer and was then agitated, thereby forming a viscosity controlling solution.

| | |
|---|---|
| Stearic acid | 0.5 parts by weight |
| Myristic acid | 0.5 parts by weight |
| Butyl Stearate | 0.5 parts by weight |
| Methyl ethyl ketone | 100 parts by weight |
| Toluene | 100 parts by weight |
| Cyclohexanone | 100 parts by weight |

Finish Dispersing Treatment, Final Paint

The above viscosity controlling solution was added to a slurry obtained by the above dispersing treatment, mixed together by agitation, and then charged in an Agitator Mill LMZ manufactured by Ashizawa Finetech Ltd. provided with zirconia beads 0.1 mm in diameter at a filling rate of 85%, and subsequently, finish dispersing treatment was performed in this mill, thereby forming a paint. The residence time for the dispersing treatment was set to 10 minutes. For the paint thus obtained, circulation filtration was performed using a depth filter with a 95% cut filtration accuracy of 1.2 μm, thereby obtaining a final paint 1 for the non-magnetic layer.

[Back Coat Paint 1]

Preparation of Binder Solution

The following composition was charged in a hyper mixer and was then agitated, thereby forming a binder solution.

| | |
|---|---|
| Nitrocellulose resin (BTH-1/2 made by Asahi Kasei Corporation) | 50 parts by weight |
| Polyester polyurethane resin (UR-8300 made by TOYOBO CO., Ltd) | 50 parts by weight |
| Methyl ethyl ketone | 260 parts by weight |
| Toluene | 260 parts by weight |
| Cyclohexanone | 260 parts by weight |

Dispersing Treatment

The following composition was charged in a ball mill and was processed by dispersing treatment for 24 hours.

| | |
|---|---|
| Carbon black (Conductex SC made by Columbian Carbon Co., average particle diameter of 20 nm, and BET specific surface area of 220 m$^2$/g) | 80 parts by weight |
| Carbon black (Sevacarb MT made by Columbian Carbon Co., average particle diameter of 350 nm, and BET specific surface area of 8 m$^2$/g) | 1 part by weight |
| α-Fe$_2$O$_3$ (TF100 made by Toda Kogyo Corp., average particle diameter of 0.1 μm) | 1 part by weight |
| The above binder solution | 880 parts by weight |

Viscosity Controlling Solution

The following composition was charged in a hyper mixer and was then agitated, thereby forming a viscosity controlling solution.

| | |
|---|---|
| Stearic acid | 1 part by weight |
| Myristic acid | 1 part by weight |
| Butyl Stearate | 2 parts by weight |
| Methyl ethyl ketone | 210 parts by weight |
| Toluene | 210 parts by weight |
| Cyclohexanone | 210 parts by weight |

Viscosity Control

After the above viscosity controlling solution was added to a slurry obtained by the above dispersing treatment, and mixed together by agitation, the mixture thus obtained was again processed by dispersing treatment using a ball mill for three hours. For the paint thus obtained, circulation filtration was performed using a depth filter with a 95% cut filtration accuracy of 1.2 μm.

Final Paint

To 100 parts by weight of the paint obtained by the filtration described above, 1 part by weight of an isocyanate compound (Colonate L made by Nippon Polyurethane Industry Co., Ltd.) was added, followed by mixing by agitation, and subsequently, circulation filtration was performed using a depth filter with a 95% cut filtration accuracy of 1.2 μm, thereby obtaining a back coat paint 1.

[Formation of Magnetic Tape]

After the non-magnetic paint was applied onto a surface of a non-magnetic substrate (a PEN film 6.2 μm thick), followed by drying and calendar processing, curing was performed by irradiation with electron beams in a nitrogen atmosphere. After the magnetic paint is applied onto this non-magnetic layer, orientation, drying, and calendar processing were sequentially performed. The orientation was performed along an in-plane longitudinal direction. The ratio in thickness of the magnetic layer to that of the non-magnetic layer after the calendar processing was 0.15 μm to 2.0 μm. Furthermore, the paint for the back coat layer was applied onto the opposite surface of the non-magnetic substrate, and after drying, calendar processing was performed. The thickness of the back coat layer after the calendar processing was 0.5 μm for all the samples.

After the roll thus formed was held at room temperature for 24 hours and was then cured in a heating oven at 60° C. for 24 hours, it was cut into a width having ½ inches and was incorporated in an LTO Ultrium cartridge to form a magnetic tape sample.

[AFM Measurement Method]

By using an atomic force microscope (Auto Probe M5) manufactured by TM Microscopes Inc., the three-dimensional center surface average roughness in a region of 10 μm×10 μM (100 μm$^2$) was measured under the following conditions.

Probe: Silicon single crystal probe, Tip curvature radius of 2 nm, and Half-corn angle of 10°

Measurement area: 10 μm×10 μm

Scanning Rate: 0.6 Hz

Number of pixels: 512×512 data points

From the image data obtained under the analytical conditions described above, the three-dimensional center surface average roughness was obtained in accordance with the following conditions.

Entire image is used for correction calculation (a specific area of the image data is not selected).

Two-dimensional inclination correction in longitudinal and lateral directions is performed for the data of the entire image.

The three-dimensional center surface average roughness is obtained from the image data processed by the inclination correction.

In addition, the surface at the average height was determined from image data of all pixels which had been subjected to the inclination correction. Each of the area of the portions having heights of at least 5.0 nm from the surface at the average height and the area of the portions having depths of at least 5.0 nm from the surface at the average height was determined, and the area share in a region of 100 μm$^2$ was determined based on the following equation.

(area share held by asperities of at least ±5.0 nm with reference to the center surface) (%)=[(area of the portions having heights of at least 5.0 nm from the surface at the average height) (μm$^2$)+(area of the portions having depths of at least 5.0 nm from the surface at the average height) (μm$^2$)]/100 (μm$^2$)×100

[Electromagnetic Conversion Characteristics]

By using Small Format Tape Evaluation System for LTO manufactured by Measurement Analysis Corporation, the measurement was performed. In this measurement, a head provided with an LTO Ultrium 1 drive was used. The results of signal amplitude and broadband SNR are shown by relative values when the value in Comparative Example 1 was regarded as 0 dB.

[Bit Error Rate]

By using an LTO Ultrium 1 drive manufactured by Hewlett-Packard Co., bit error rate was measured. The results are shown by relative values when the value in Comparative Example 1 was regarded as 0 in logarithm.

The results are collectively shown in Tables 1 and 2 below.

TABLE 1

|  | Comparative Example 1 | Comparative Example 2 | Comparative Example 3 | Example 1 | Example 2 | Example 3 |
| --- | --- | --- | --- | --- | --- | --- |
| Magnetic Paint | 1-D | 1-D | 1-A | 1-A | 1-A | 1-A |
| Magnetic Powder Average Long Axis Length (nm) | 95 | 95 | 75 | 75 | 75 | 75 |
| Finish Dispersing Medium Diameter (mm) | 0.1 | 0.1 | 0.1 | 0.1 | 0.1 | 0.1 |
| Residence Time (min) | 10 | 20 | 1 | 5 | 10 | 20 |
| Three-Dimensional Central Surface Average Roughness (nm) | 4.0 | 2.9 | 3.5 | 2.9 | 2.6 | 2.5 |
| Area share Held by Asperities of at least ±5.0 mm with Reference to the center surface | 20.0 | 13.0 | 15.0 | 12.0 | 9.3 | 8.9 |
| Signal Amplitude (dB) | 0.0 | +0.1 | +0.3 | +1.0 | +1.5 | +1.6 |
| Broadband SNR (dB) | 0.0 | +0.1 | +0.2 | +1.2 | +1.5 | +1.7 |
| Bit Error Rate (log10) | 0.0 | −0.2 | −0.2 | −1.0 | −1.3 | −1.5 |

TABLE 2

|  | Example 4 | Example 5 | Comparative Example 4 | Example 6 | Example 7 |
| --- | --- | --- | --- | --- | --- |
| Magnetic Paint | 1-A | 1-A | 1-A | 1-B | 1-C |
| Magnetic Powder Average Long Axis Length (nm) | 75 | 75 | 75 | 60 | 40 |
| Finish Dispersing Medium Diameter (mm) | 0.3 | 0.5 | 0.8 | 0.1 | 0.1 |
| Residence Time (min) | 10 | 10 | 10 | 10 | 10 |
| Three-Dimensional Center Surface Average Roughness (nm) | 2.6 | 2.8 | 3.8 | 2.3 | 2.0 |
| Area share Held by Asperities of at least ±5.0 mm with Reference to the center surface | 9.8 | 11.0 | 17.0 | 7.0 | 5.0 |
| Signal Amplitude (dB) | +1.5 | +1.3 | +0.2 | +2.0 | +2.3 |
| Broadband SNR (dB) | +1.5 | +1.1 | +0.3 | +2.3 | +2.8 |
| Bit Error Rate (log10) | −1.2 | −1.0 | −0.1 | −2.0 | −2.2 |

Examples 8 to 14 and Comparative Examples 5 to 8

[Magnetic Paint 2-A]

Preparation of Binder Solution

The following composition was charged in a hyper mixer and then mixed by agitation, thereby forming a binder solution.

| | |
|---|---|
| Vinyl chloride-based resin (MR-110 made by Zeon Corporation) | 10 parts by weight |
| Polyester polyurethane resin (UR-8300 made by TOYOBO CO., Ltd.) | 7 parts by weight |
| Methyl ethyl ketone | 21 parts by weight |
| Toluene | 21 parts by weight |
| Cyclohexanone | 21 parts by weight |

Kneading

The following composition was charged in a pressure kneader and was then kneaded for two hours.

| | |
|---|---|
| Barium ferrite magnetic powder (a) (Hc of 216 kA/m (2,710 Oe), σs of 50.8 Am$^2$/kg (50.8 emu/g), BET specific surface area of 65 m$^2$/g, and average tabular diameter of 30 nm) | 100 parts by weight |
| α-Al$_2$O$_3$ (HIT-60A made by Sumitomo Chemical Co., Ltd.; average particle diameter of 0.20 μm) | 10 parts by weight |
| The above binder solution | 40 parts by weight |

The following composition was added to a slurry obtained from the above composition through kneading, thereby obtaining an optimum viscosity for dispersing treatment.

| | |
|---|---|
| The above binder solution | 40 parts by weight |
| Methyl ethyl ketone | 15 parts by weight |
| Toluene | 15 parts by weight |
| Cyclohexanone | 15 parts by weight |

Dispersing Treatment

By an Agitator Mill LMJ manufactured by Ashizawa Finetech Ltd. provided with zirconia beads 0.8 mm in diameter therein at a filling rate of 85%, the slurry thus obtained was processed by dispersing treatment. In this step, the residence time for the dispersing treatment was set to 90 minutes.

Viscosity Controlling Solution

The following composition was charged in a hyper mixer and was then mixed by agitation for one hour, thereby forming a viscosity controlling solution.

| | |
|---|---|
| Stearic acid | 0.5 parts by weight |
| Myristic acid | 0.5 parts by weight |
| Butyl Stearate | 0.5 parts by weight |
| Methyl ethyl ketone | 210 parts by weight |
| Toluene | 210 parts by weight |
| Cyclohexanone | 210 parts by weight |

Finish Dispersing Treatment

The above viscosity controlling solution was added to a slurry obtained by the above dispersing treatment, mixed together by agitation, and then charged in an Agitator Mill LMZ manufactured by Ashizawa Finetech Ltd. provided with zirconia beads at a filling rate of 85%, the beads having bead diameters (medium diameter) shown in Tables 3 and 4 below, and subsequently, finish dispersing treatment was performed in this mill, thereby forming a paint. The residence times for the dispersing treatment are also shown in Table 3 and 4 below. For the paint thus obtained, circulation filtration was performed using a depth filter with a 95% cut filtration accuracy of 1.2 μm.

Final Paint

To 100 parts by weight of the paint obtained by the filtration described above, 0.8 parts by weight of an isocyanate compound (Colonate L made by Nippon Polyurethane Industry Co., Ltd.) was added and mixed by agitation, followed by circulation filtration using a depth filter with a 95% cut filtration accuracy of 1.2 μm, thereby obtaining a final paint 2-A for the magnetic layer.

[Magnetic Paint 2-B]

Except that a barium ferrite magnetic powder (b) (Hc of 215 kA/m (2,700 Oe), σs of 55 Am$^2$/kg (55 emu/g), BET specific surface area of 50 m$^2$/g, and average tabular diameter of 50 nm) was used instead of the barium ferrite magnetic powder (a), a magnetic paint 2-B was prepared in the same manner as that described above.

[Magnetic Paint 2-C]

Except that a barium ferrite magnetic powder (c) (Hc of 215 kA/m (2,700 Oe), σs of 50 Am$^2$/kg (50 emu/g), BET specific surface area of 70 m$^2$/g, and average tabular diameter of 20 nm) was used instead of the barium ferrite magnetic powder (a), a magnetic paint 2-C was prepared in the same manner as that described above.

[Non-magnetic Paint 2]

Preparation of Binder Solution

The following composition was charged in a hyper mixer and was then agitated, thereby forming a binder solution.

Electron-beam curable vinyl chloride-based resin 10 parts by weight (TB-4246 made by TOYOBO CO., Ltd., formed by acrylic modification of MR-110 made by Zeon Corporation using 2-isocyanatoethyl methacrylate; polymerization degree of 300, the number of —OSO$_3$K, polar groups, being 1.5 per one molecule, and the number of acrylic groups being 6 per one molecule)

Electron-beam curable polyester polyurethane resin 7 parts by weight (TB-1216 made by TOYOBO CO., Ltd., number average molecular weight of 20,000, Tg of 10° C., and the number of acrylic groups being 6 per one molecule)

| | |
|---|---|
| Methyl ethyl ketone | 21 parts by weight |
| Toluene | 21 parts by weight |
| Cyclohexanone | 21 parts by weight |

Kneading

The following composition was charged in a pressure kneader and was kneaded for two hours.

| | |
|---|---|
| Needle-like α-Fe$_2$O$_3$ | 85 parts by weight |
| (DAN-855BX made by Toda Kogyo Corp., average long axis length of 70 nm, and BET specific surface area of 58 m$^2$/g) | |
| Carbon black | 15 parts by weight |
| (#950B made by Mitsubishi Chemical Corporation; average particle diameter of 16 nm, BET specific surface area of 260 m$^2$/g, and DPB oil absorption of 74 ml/100 g) | |
| The above binder solution | 40 parts by weight |
| The following composition was added to a slurry obtained from the above composition through kneading, thereby obtaining an optimum viscosity for dispersing treatment. | |
| The above binder solution | 40 parts by weight |
| Methyl ethyl ketone | 15 parts by weight |
| Toluene | 15 parts by weight |
| Cyclohexanone | 15 parts by weight |

Dispersing Treatment

By an Agitator Mill LMJ manufactured by Ashizawa Finetech Ltd. provided with zirconia beads 0.8 mm in diameter therein at a filling rate of 85%, the slurry thus obtained was processed by dispersing treatment. In this step, the residence time for the dispersing treatment was set to 60 minutes.

Viscosity Controlling Solution

The following composition was charged in a hyper mixer, and was agitated, thereby forming a viscosity controlling solution.

| | |
|---|---|
| Stearic acid | 0.5 parts by weight |
| Myristic acid | 0.5 parts by weight |
| Butyl Stearate | 0.5 parts by weight |
| Methyl ethyl ketone | 100 parts by weight |
| Toluene | 100 parts by weight |
| Cyclohexanone | 100 parts by weight |

Finish Dispersing Treatment, Final Paint

The above viscosity controlling solution was added to a slurry obtained by the above dispersing treatment, mixed together by agitation, and then charged in an Agitator Mill LMZ manufactured by Ashizawa Finetech Ltd. provided with zirconia beads 0.1 mm in diameter at a filling rate of 85%, and subsequently, finish dispersing treatment was performed in this mill, thereby forming a paint. The residence time for this dispersing treatment was set to 10 minutes. For the paint thus obtained, circulation filtration was performed using a depth filter with a 95% cut filtration accuracy of 1.2 μm, thereby obtaining a final paint 2 for the non-magnetic layer.

[Back Coat Paint 2]

Preparation of Binder Solution

The following composition was charged in a hyper mixer and was then agitated, thereby forming a binder solution.

| | |
|---|---|
| Nitrocellulose resin | 50 parts by weight |
| (BTH-1/2 made by Asahi Kasei Corporation) | |
| Polyester polyurethane resin | 50 parts by weight |
| (UR-8300 made by TOYOBO CO., Ltd) | |
| Methyl ethyl ketone | 260 parts by weight |
| Toluene | 260 parts by weight |
| Cyclohexanone | 260 parts by weight |

Dispersing Treatment

The following composition was charged in a ball mill and was processed by dispersing treatment for 24 hours.

| | |
|---|---|
| Carbon black | 80 parts by weight |
| (Conductex SC made by Columbian Carbon Co., average particle diameter of 20 nm, and BET specific surface area of 220 m$^2$/g) | |
| Carbon black | 1 part by weight |
| (Sevacarb MT made by Columbian Carbon Co., average particle diameter of 350 nm, and BET specific surface area of 8 m$^2$/g) | |
| α-Fe$_2$O$_3$ | 1 part by weight |
| (TF100 made by Toda Kogyo Corp., average particle diameter of 0.1 μm) | |
| The above binder solution | 880 parts by weight |

Viscosity Controlling Solution

The following composition was charged in a hyper mixer, and was agitated, thereby forming a viscosity controlling solution.

| | |
|---|---|
| Stearic acid | 1 part by weight |
| Myristic acid | 1 part by weight |
| Butyl Stearate | 2 part by weight |
| Methyl ethyl ketone | 210 parts by weight |
| Toluene | 210 parts by weight |
| Cyclohexanone | 210 parts by weight |

Viscosity Control

After the above viscosity controlling solution was added to a slurry obtained by the above dispersing treatment, and was mixed together by agitation, the mixture thus obtained was again processed by dispersing treatment using a ball mill for three hours. For the paint thus obtained, circulation filtration was performed using a depth filter with a 95% cut filtration accuracy of 1.2 μm.

Final Paint

To 100 parts by weight of the paint obtained through the filtration described above, 1 part by weight of an isocyanate compound (Colonate L made by Nippon Polyurethane Industry Co., Ltd.) was added, followed by mixing by agitation, and subsequently, circulation filtration was performed using a depth filter with a 95% cut filtration accuracy of 1.2 μm, thereby obtaining a back coat paint 2.

By using the individual paints described above, magnetic tape samples were formed in the same manner as that in Example 1 or the like. The thickness of the back coat layer of each sample after calendar processing was 0.5 μm.

From the magnetic tape samples thus formed, as in the case of Example 1 or the like, the three dimensional central-plane average roughness and the irregular surface areas located at positions higher than the central-plane by ±5.0 nm or more were obtained by the AFM measurement, and the single amplitude, broadband SNR, and bit error rate were also evaluated. The results of the signal amplitude and the broadband SNR are shown by the relative values obtained when the value in Comparative Example 5 is regarded as 0 dB, and the bit error rate is shown by the relative value obtained when the value in Comparative Example 5 is regarded as 0 in logarithm.

The results are collectively shown in Tables 3 and 4.

TABLE 3

|  | Comparative Example 5 | Comparative Example 6 | Comparative Example 7 | Example 8 | Example 9 | Example 10 |
|---|---|---|---|---|---|---|
| Magnetic Paint | 2-B | 2-B | 2-A | 2-A | 2-A | 2-A |
| Magnetic Powder Average Tabular Diameter (nm) | 50 | 50 | 30 | 30 | 30 | 30 |
| Finish Dispersing Medium Diameter (mm) | 0.1 | 0.1 | 0.1 | 0.1 | 0.1 | 0.1 |
| Residence Time (min) | 10 | 30 | 1 | 5 | 10 | 30 |
| Three-Dimensional Center Surface Average Roughness (nm) | 3.8 | 2.7 | 3.3 | 3.0 | 2.7 | 2.3 |
| Area share Held by Asperities of at least ±5.0 mm with Reference to the center surface | 23.0 | 9.8 | 15.0 | 12.0 | 10.0 | 9.0 |
| Signal Amplitude (dB) | 0.0 | +0.2 | +0.2 | +1.0 | +1.2 | +1.6 |
| Broadband SNR (dB) | 0.0 | +0.1 | +0.2 | +1.1 | +1.2 | +1.5 |
| Bit Error Rate (log10) | 0.0 | −0.2 | −0.1 | −1.0 | −1.2 | −1.6 |

TABLE 4

|  | Example 11 | Example 12 | Comparative Example 8 | Example 13 | Example 14 |
|---|---|---|---|---|---|
| Magnetic Paint | 2-A | 2-A | 2-A | 2-C | 2-C |
| Magnetic Powder Average Tabular Diameter (nm) | 30 | 30 | 30 | 20 | 20 |
| Finish Dispersion Medium Diameter (mm) | 0.3 | 0.5 | 0.8 | 0.1 | 0.1 |
| Residence Time (min) | 30 | 30 | 30 | 10 | 30 |
| Three-Dimensional Center Surface Average Roughness (nm) | 2.5 | 2.8 | 3.5 | 2.2 | 1.8 |
| Area share Held by Asperities of at least ±5.0 mm with Reference to the center surface | 9.3 | 9.7 | 17.0 | 8.5 | 8.0 |
| Signal Amplitude (dB) | +1.5 | +1.2 | +0.3 | +1.8 | +2.3 |
| Broadband SNR (dB) | +1.4 | +1.1 | +0.3 | +1.7 | +2.0 |
| Bit Error Rate (log10) | −1.5 | −1.3 | −0.1 | −2.0 | −2.3 |

What is claimed is:

1. A magnetic recording medium comprising, in order:
a non-magnetic substrate;
a non-magnetic layer containing a non-magnetic powder which comprises carbon black having an average particle diameter of 10 nm to 100 nm, and a binder resin; and
a magnetic layer containing a ferromagnetic metal powder and a binder resin,
wherein the ferromagnetic metal powder has an average long axis length of 80 nm or less,
a three-dimensional center surface average roughness of a surface of the magnetic layer in a region of 100 μm$^2$ based on a measurement with an atomic force microscope is 3.0 nm or less, and
the area share held by asperities of at least ±5.0 nm with reference to the surface at an average height is 15 percent or less in a region of 100 μm$^2$ on the above described magnetic layer surface based on a measurement with an atomic force microscope.

2. A magnetic recording and reproducing system in which reproduction is performed using a magnetoresistive head, said system comprising the magnetic recording medium according to claim 1.

3. The magnetic recording medium according to claim 1, wherein binder resin of the non-magnetic layer comprises an electron-beam functional group.

4. The magnetic recording medium according to claim 1, wherein the magnetic layer has a thickness of 300 nm or less.

5. A magnetic recording medium comprising, in order:

a non-magnetic substrate;

a non-magnetic layer containing a non-magnetic powder which comprises carbon black having an average particle diameter of 10 nm to 100 nm, and a binder resin; and a magnetic layer containing a hexagonal ferrite magnetic powder and a binder resin, wherein the hexagonal ferrite magnetic powder has an average tabular diameter in the range of from 10 to 40 nm, a three-dimensional center surface average roughness of a surface of the magnetic layer in a region of 100 μm² based on a measurement with an atomic force microscope is 3.0 nm or less, and the area share held by asperities of at least ±5.0 nm with reference to the surface at an average height is 15 percent or less in a region of 100 μm² on the above-described magnetic layer surface based on a measurement with an atomic force microscope.

6. A magnetic recording and reproducing system in which reproduction is performed using a magnetoresistive head, said system comprising the magnetic recording medium according to claim 5.

7. The magnetic recording medium according to claim 5, wherein binder resin of the non-magnetic layer comprises an electron-beam functional group.

8. The magnetic recording medium according to claim 5, wherein the magnetic layer has a thickness of 300 nm or less.

9. The magnetic recording medium according to claim 1, wherein said average long axis length is 20 to 80 nm.

10. The magnetic recording medium according to claim 1, wherein said average long axis length is 20 to 75 nm.

11. The magnetic recording medium according to claim 5, wherein said average tabular diameter is 10 to 35 nm.

12. The magnetic recording medium according to claim 1, wherein said three-dimensional center surface area roughness is 2.5 nm or less.

13. The magnetic recording medium according to claim 5, wherein said three-dimensional center surface area roughness is 2.5 nm or less.

14. The magnetic recording medium according to claim 1, wherein said area share is 10% or less.

15. The magnetic recording medium according to claim 5, wherein said area share is 10% or less.

16. The magnetic recording medium according to claim 1, wherein the binder resin of the magnetic layer comprises a combination of at least one vinyl chloride-based copolymer and at least one polyurethane resin.

17. The magnetic recording medium according to claim 5, wherein the binder resin of the magnetic layer comprises a combination of at least one vinyl chloride-based copolymer and at least ohe polyurethane resin.

* * * * *